United States Patent [19]

Homma

[11] Patent Number: 4,611,914

[45] Date of Patent: Sep. 16, 1986

[54] SUNBEAM INCIDENT ANGLE DETECTING DEVICE

[75] Inventor: Mitsuo Homma, Yokohama, Japan

[73] Assignee: Tokyo Shibaura Denki Kabushiki Kaisha, Kawasaki, Japan

[21] Appl. No.: 548,439

[22] Filed: Nov. 3, 1983

[30] Foreign Application Priority Data

Nov. 4, 1982 [JP] Japan ................................ 57-193784

[51] Int. Cl.$^4$ .................. G01B 11/26; G01C 1/00; G01J 1/20
[52] U.S. Cl. ................. 356/141; 250/203 R; 356/152
[58] Field of Search .................. 356/141, 152; 250/203 S, 203 R

[56] References Cited

U.S. PATENT DOCUMENTS

| | | | |
|---|---|---|---|
| 3,437,815 | 4/1969 | Bleicher | 250/203 R |
| 3,493,765 | 2/1970 | Kelly et al. | 250/203 R |
| 3,780,966 | 12/1973 | Newcomb, Jr. et al. | 244/1 |
| 3,992,099 | 11/1976 | Laughlin | 250/203 R |
| 4,018,532 | 4/1977 | Fletcher et al. | 356/141 |
| 4,155,649 | 5/1979 | Leiboff | 356/141 |
| 4,225,781 | 9/1980 | Hammons | 356/141 |

Primary Examiner—S. C. Buczinski
Attorney, Agent, or Firm—Finnegan, Henderson, Farabow, Garrett & Dunner

[57] ABSTRACT

A device for detecting a sunbeam incident angle comprises at least one pair of solar cells disposed to be perpendicular to each other, wherein the short-circuit currents flowing in the respective solar cells in the pair are detected, a relative ratio between the detected short circuit-currents is computed, and the sunbeam incident angle is detected on the basis of that relative ratio.

5 Claims, 7 Drawing Figures

SUNBEAM INCIDENT ANGLE DETECTING DEVICE

BACKGROUND OF THE INVENTION

1. Field of the Invention

The present invention relates to a device for detecting sunbeam incident angle, and particularly to a sunbeam incident angle detecting device for use in circuitry for monitoring the power generated by solar cell paddles mounted on an artificial satellite.

2. Description of the Prior Art

In an artificial satellite, electric power is supplied by a solar battery consisting of solar cells built in the artificial satellite. For a small artificial satellite which consumes a relatively small amount of electric power, sufficient power can be supplied by providing solar cells over the whole outer surface of the satellite body. In small artificial satellites with such a solar cell arrangement, the electric power generated by the solar battery falls within an allowable range irrespective of the attitude of the artificial satellite.

On the other hand, a large artificial satellite with sophisticated functions consuming much more electric power also requires one or more solar cell paddles. One side of each solar paddle is provided with many solar cells. An artificial satellite with this type of solar cell arrangement orbits with its body being fixedly directed toward the earth. The paddles are designed to rotate according to the sunbeam incident angle with respect to the paddle face so that the solar cells on the paddles always catch the incident sunbeams.

The electric power $P_G$ generated by a solar cell paddle is given as follows:

$$P_G \simeq K \times S \times \eta \times P_{SI} \times \sin\theta \, (W) \tag{1}$$

where K is a constant determined by such factors as temperature, calendar day and season of the year, S is the effective area (m$^2$) of the solar cell paddle, $\eta$ is the conversion efficiency of the solar cell, $P_{SI}$ is the illumination intensity (W/m$^2$) of the sunbeam, and $\theta$ is the angle (degrees) between the incident sunbeam and the solar cell surface.

Estimation and evaluation of the electric power generated by the solar cell paddle play decisive roles for the reliable operation of the artificial satellite system. As seen from Equation (1), the incident angle $\theta$ of a sunbeam with respect to the solar cell surface is an influential factor in determining the power $P_G$. In practice, the incident angle $\theta$ is most difficult to estimate, and conventionally it has been analytically estimated by using a large computer. Calculations of estimation programs had to be executed based on information including the satellite orbit factors, the number of days elapsed from the satellite launch day, the calendar day, the satellite attitude, temperature, deterioration coefficient by radiation, etc. However, such a conventional method has involved the following difficulties. That is, the calculation of the incident angle $\theta$ requires enormous time, and thus in the case of an artificial satellite with a rather short visible time, the amount of the generated power $P_G$ could not be estimated precisely. Further, each time the attitude of the satellite is changed, the sunbeam incident angle $\theta$ must be re-calculated with the aid of the computer. Accordingly, the conventional method of finding the incident angle $\theta$ using estimation programs has been unable to cope with such an emergent situation as a sudden change in the paddle attitude.

SUMMARY OF THE INVENTION

Accordingly, in view of the above problems in the prior art, it is an object of the present invention to provide a simple device for detecting sunbeam incident angle which enables an accurate detection of the sunbeam incident angle on a real time basis and is not influenced by the secular variation in solar cells for sensing sunbeam incident angle regardless of an attitude change of a solar cell paddle.

Another object of this invention is a sunbeam incident angle detecting device which is not adversely affected by variations in sunbeam intensity.

Still another object of this invention is a sunbeam incident angle detecting device which is operable over a wide range of temperatures of solar cell surfaces.

A further object of this invention is a sunbeam incident angle detecting device which can withstand a large accumulated exposure to radiant rays.

Yet another object of this invention is a sunbeam incident angle detecting device which is also capable of determining the azimuth of the sunbeam.

In order to attain these and other objects, the device of the present invention comprises at least one pair of solar cells arranged perpendicular to each other which are mounted, for example, on solar cell paddles, means for detecting the respective short-circuit currents flowing in the solar cells, and means for determining the sunbeam incident angle from a relative ratio between the short-circuit currents.

BRIEF DESCRIPTION OF THE DRAWINGS

Other objects and advantages of the present invention will become clear from the following description of the invention when considered with reference to the accompanying drawings, in which.

DETAILED DESCRIPTION OF THE PREFERRED EMBODIMENTS

Figure 1:
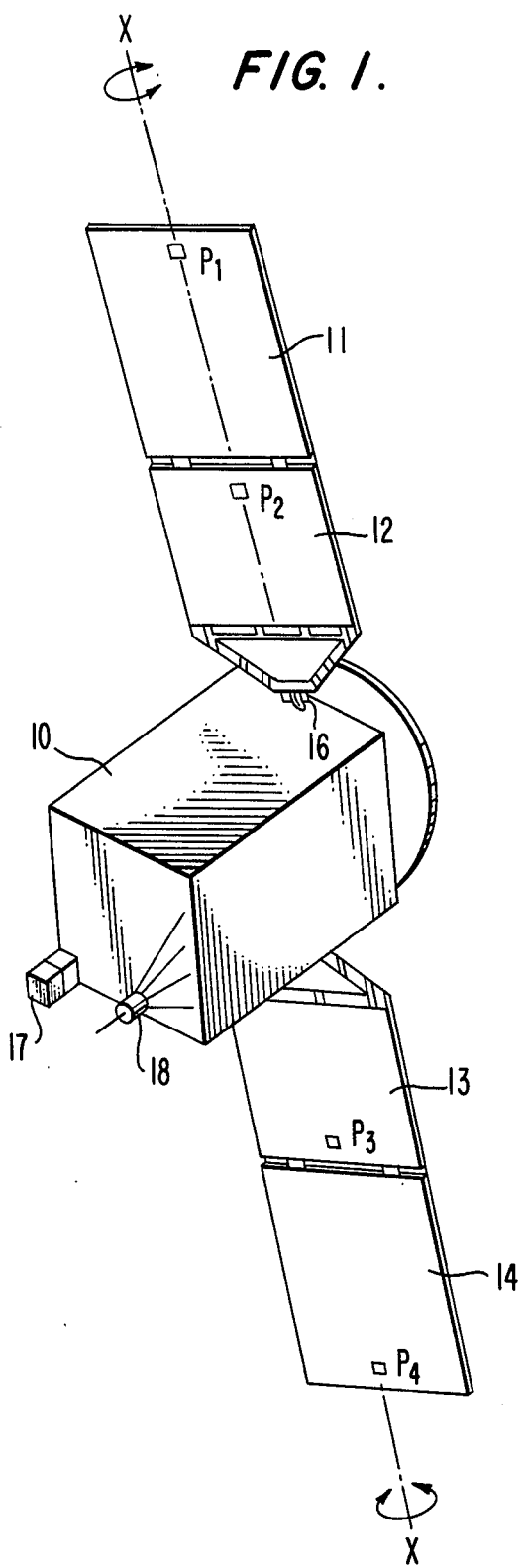
FIG. 1 is a perspective view showing an example of an artificial satellite with solar cell paddles.

Referring now to FIG. 1, a satellite body 10 is provided with four solar cell paddles 11, 12, 13, and 14. One face of these solar cell paddles 11 to 14 is provided with a multiplicity of solar cells to form sunbeam receiving surfaces on the paddles.

The solar cell paddles 11 to 14 are designed to rotate about the paddle axis X so that the sunbeam receiving surfaces are always directed toward the incident sunbeams. The rotation of the paddles is controlled by a sun tracking system (not shown) together with a paddle rotation mechanism 16 including a step motor.

On the satellite body 10, an earth sensor 17, and an antenna 18 are provided, the latter being controlled in its attitude to always be directed in a fixed direction with respect to the earth. On the solar cell paddles 11, 12, 13, and 14, sunbeam incident angle detecting devices $P_1$, $P_2$, $P_3$, and $P_4$ are provided, respectively. In FIG. 1, these devices are respectively disposed at the furthermost ends of each paddle from the satellite body 10 and on the paddle axis X. Although such arrangement of devices is advantageous in view of the development of rotation controls for the paddles, these devices may be disposed any place on the paddle so long as they are not shadowed by the satellite body.

Furthermore, the sunbeam incident angle detecting device is not necessarily provided on each solar cell paddle. For example, the paddles 11 and 12 may share the sunbeam incident angle detecting device $P_1$ and the paddles 13 and 14 may share the detector $P_3$.

The principle of the sunbeam incident angle detecting device according to the present invention will now be described with reference to FIG. 2.

Figure 2:
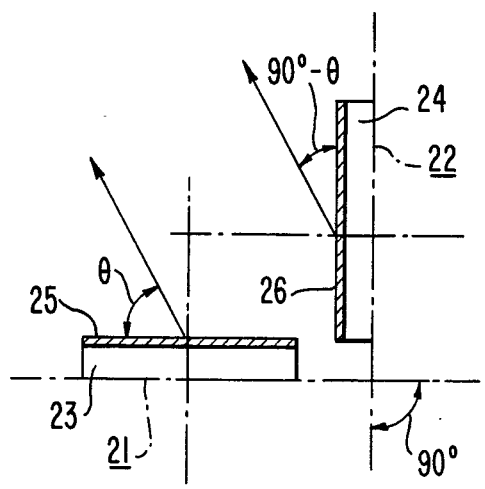
FIG. 2 is a perspective view illustrating the principle of a sunbeam incident angle detecting device according to the present invention.

In FIG. 2, there is shown sunbeam receiving means comprising a pair of solar cells 21 and 22 having substantially the same characteristics. The solar cells 21 and 22 comprise substrates 23 and 24, and photo-electric layers 25 and 26 confronting each other. In FIG. 2, arrowed lines indicate sunbeam direction.

Figure 3:
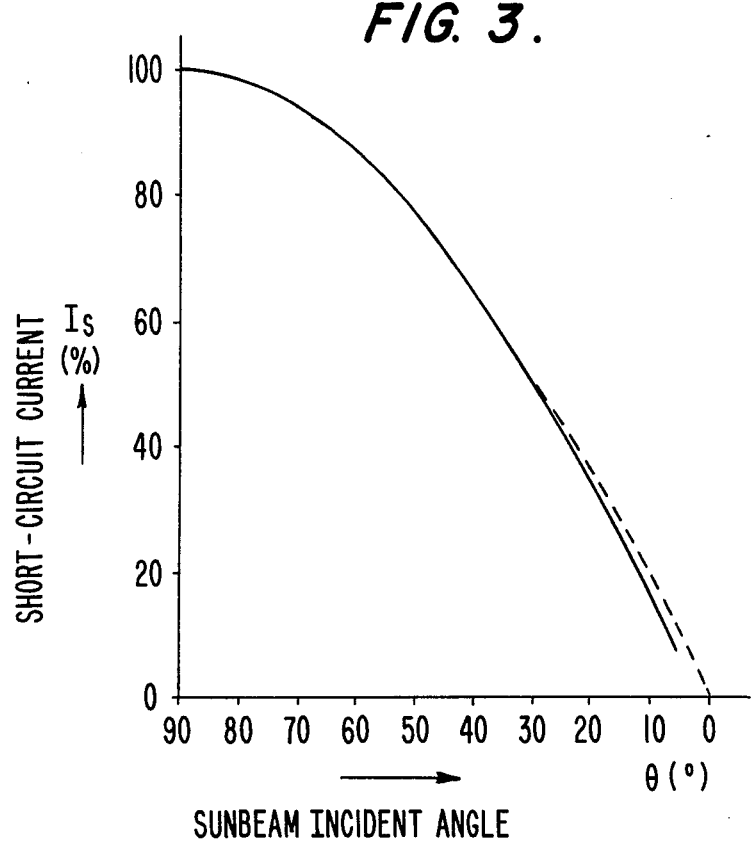
FIG. 3 is a graph showing a relation between the sunbeam incident angle and the short-circuit current of a solar cell.

FIG. 3 shows the relation between a short-circuit current $I_S$ of the solar cells 21 and 22 and an incident angle $\theta$ of the sunbeam which is expressed by the following equation.

$$I_S = K_0 \times \sin \theta \quad (2)$$

That is, the short-circuit current $I_S$ is proportional to the sine of the incident angle $\theta$. In FIG. 3, a broken line represents a sine curve and a solid line represents an actually measured curve of the short-circuit current $I_S$ as a function of the sunbeam incident angle $\theta$.

Figure 4:
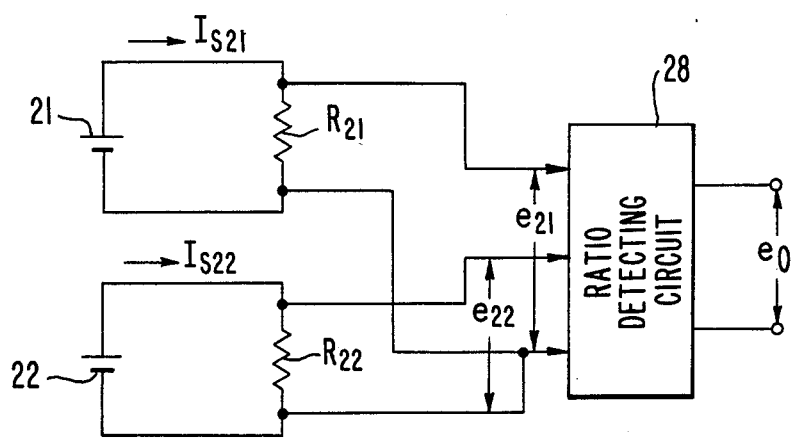
FIG. 4 is a circuit diagram showing an embodiment of the sunbeam incident angle detecting device according to the present invention.

The sunbeam incident angle detecting device further includes means for detecting respective short-circuit currents flowing in the solar cells. As embodied herein, and with reference to FIG. 4, the detecting means comprises resistors $R_{21}$ and $R_{22}$ having respectively low resistance values (e.g. 0.5 Ω). The resistors $R_{21}$ and $R_{22}$ are connected across respective output terminals of the cells 21 and 22 arranged as in FIG. 2. The short-circuit currents $I_{S21}$ and $I_{S22}$ of the solar cells 21 and 22 flowing through the resistors $R_{21}$ and $R_{22}$ are detected in the form of voltages $e_{21}$ and $e_{22}$ produced across the resistors.

The detected voltages $e_{21}$ and $e_{22}$ are supplied to means for determining the sunbeam incident angle from a relative ratio between the detected short-circuit currents. As embodied herein the determining means comprises an input signal ratio detecting circuit 28 where the ratio between these voltages $e_{21}$ and $e_{22}$ is detected. In other words, the input signal ratio detecting circuit 28 outputs a signal $e_0$ which is expressed as follows.

$$e_0 = K \times e_{21}/e_{22} \quad (3)$$
$$= (R_{21} \times K_1 \times \sin \theta)/(R_{22} \times K_2 \times \cos \theta)$$
$$\simeq k \times \tan \theta$$

In equation (3), the short-circuit current $I_{S22}$ of the solar cell 22 is given as $K_2(\cos \theta)$. This is because the cell 22 is positioned perpendicularly to the other cell 21.

Figure 5:
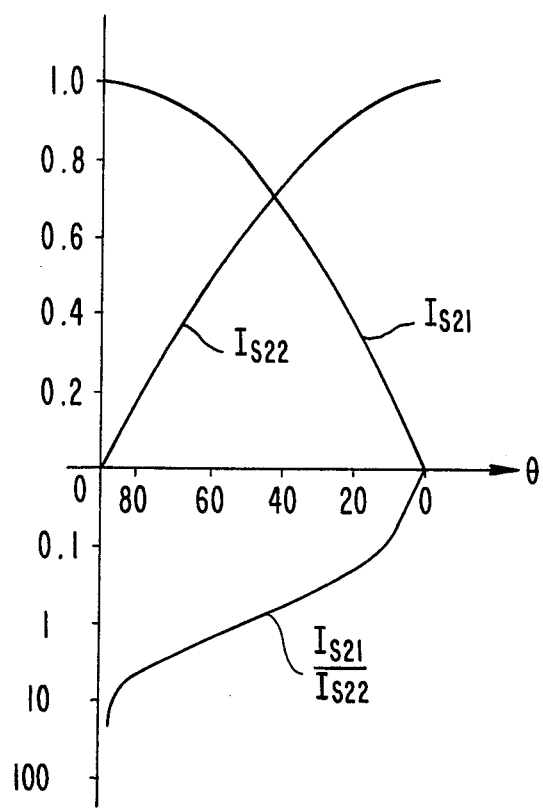
FIG. 5 is a graph for explaining the operation of the device shown in FIG. 4.

Since the output signal $e_0$ of the input signal ratio detector 28 is proportional to the sunbeam incident angle $\theta$, the sunbeam incident angle $\theta$ can be detected from Equation (3) if the signal $e_0$ is known. That is, the short-circuit currents $I_{S21}$ and $I_{S22}$ of the solar cells 21 and 22 as well as the short-circuit ratio $I_{S21}/I_{S22}$ have a correlation as shown in FIG. 5. The incident angle or elevation angle $\theta$ of a sunbeam directed to the mutually-perpendicular solar cells 21 and 22 is expressed as $\theta \propto \tan^{-1}(I_{S21}/I_{S22})$. Hence, the sunbeam incident angle $\theta$ can be immediately obtained from the output signal $e_0$.

According to the above embodiment, the solar cells 21 and 22 are provided on the light-receiving surfaces of the solar cell paddles 12 in mutually perpendicular relations, so that the sunbeam incident angle is obtained on the basis of the relative ratio between the short-circuit currents of the cells 21 and 22. Accordingly, the device of the present invention will be less affected by variations in the sunbeam intensity due to seasonal change when compared with the above-mentioned prior art methods of calculating and estimating the sunbeam incident angle. Moreover, the incident angle can be detected with a much higher accuracy by means of the present invention. As a result, the device of the present invention enables the accurate estimation of the electric power generated by the solar cells.

Further, because the sunbeam incident angle can be detected on a real-time basis, the device of the present invention has the further advantage of quickly responding to an emergent situation such as a sudden attitude change of the satellite body 10.

The short-circuit currents $I_{S21}$ and $I_{S22}$ flowing in the solar cells 21 and 22 may vary due to such factors as the variations in the sunbeam intensity and temperature on the solar cell surfaces as well as deterioration of the solar cells themselves caused by the accumulated exposure to radiant rays. However, in the above embodiment, since the sunbeam incident angle $\theta$ is detected on the basis of the relative ratio between the short-circuit currents, the adverse effects resulting from the above factors are eliminated. In this connection, the short-circuit current of the solar cell usually has a temperature change coefficient of about 0.05%/C.°.

Figure 6:
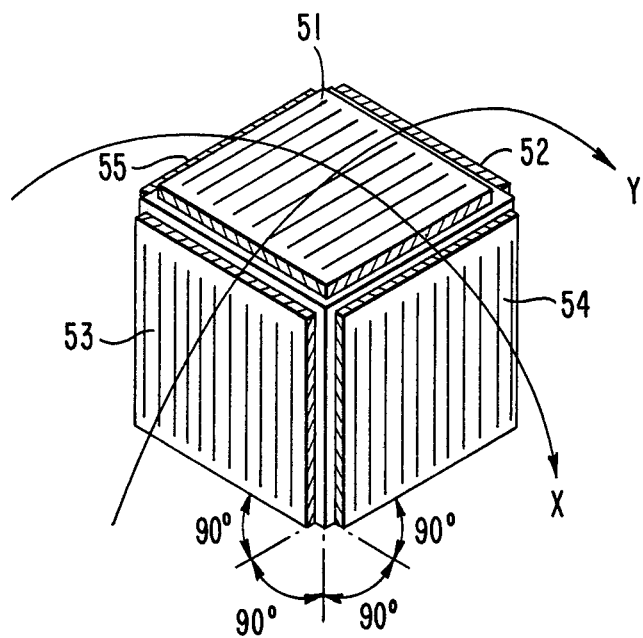
FIG. 6 is another example of a solar cell arrangement of the device of the present invention.

Although the sunbeam incident angle $\theta$ has been detected on the basis of the short-circuit currents of the solar cells 21 and 22 disposed on the cell paddle 11 whose azimuth is being followed in the above embodiment, not only the sunbeam incident angle (elevation) but also its azimuth can be detected by applying the principle of the present invention. That is, as shown in FIG. 6, five plate-shaped solar cells 51, 52, 53, 54, and 55 are arranged in mutually perpendicular relations, i.e., in a cubic form, and the relative ratios between short-circuit currents of the cell pairs (51, 52), (51, 53), (51, 54), and (51, 55) are calculated. The sunbeam incident angles with respect to both the X and Y directions can be detected on the basis of the calculated ratios. The azimuth of the sunbeam can be detected from the obtained X-direction and Y-direction incident angles by performing a simple geometrical calculation.

Figure 7:
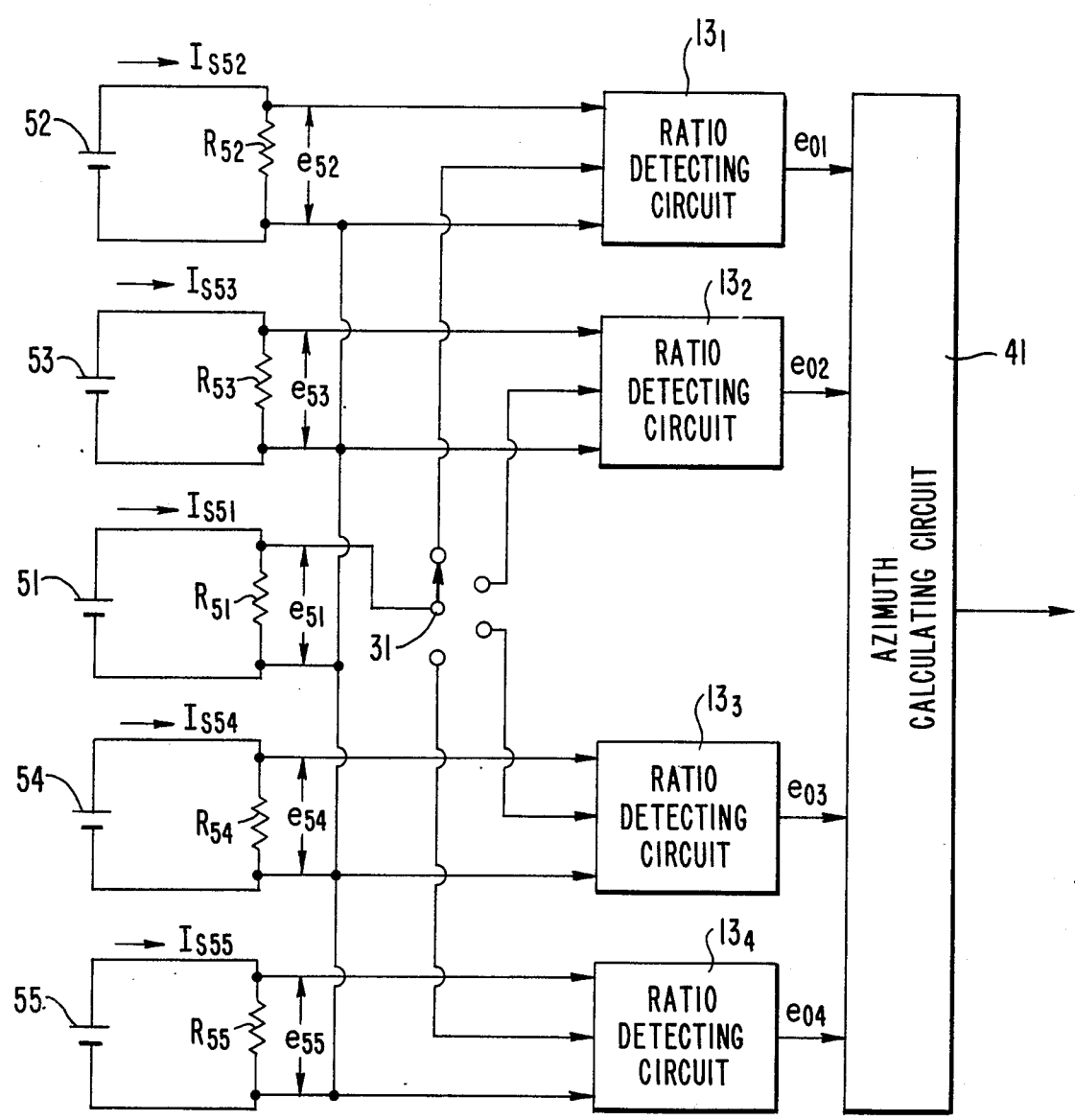
FIG. 7 is a block diagram showing another embodiment of the present invention in which the solar cell arrangement shown in FIG. 6 is employed.

The short-circuit currents $I_{S51}$ and $I_{S55}$ of the solar cells 51 to 55 are detected in the form of voltages $e_{51}$ to $e_{55}$ appearing across resistors $R_{51}$ to $R_{55}$ of low resistance values connected between respective output terminals of the solar cells as shown in FIG. 7. The voltages $e_{52}$, $e_{53}$, $e_{54}$, and $e_{55}$ are applied to respective input signal ratio detecting circuits $13_1$, $13_2$, $13_3$, and $13_4$ and the voltage $e_{51}$ is applied through a changeover switch means 31 to the respective detecting circuits so that the ratio detectors $13_1$, $13_2$, $13_3$, and $13_4$ perform respective relative ratio calculations in accordance with Equation (3) and produce signals $e_{01}$, $e_{02}$, $e_{03}$, and $e_{04}$ indicative of respective sunbeam incident angles in the four solar cell pairs. These signals $e_{01}$ to $e_{04}$ are applied to an azimuth calculating circuit 41 to perform a geometrical calculation whereby the azimuth of the sunbeam can be detected.

The embodiment shown in FIG. 7 is effective in such a case in which, for example, a solar cell paddle is not mounted with a sunbeam-azimuth tracking mechanism.

The above explanation has been made as to the case where the present invention is applied to the solar cell paddles of an artificial satellite, but it should be understood that the intention is not limited to the particular embodiment described but rather is subject to other possible modifications, alterations, and equivalent arrangements within the scope of appended claims.

What is claimed is:

1. A device for detecting a sunbeam incident angle with respect to a surface comprising:
   first and second solar cells attached to said surface and arranged in a relation perpendicular to each other;
   a first resistor connected across the output of said first solar cell;
   a second resistor connected across the output of said second solar cell, said first resistor and said second resistor each having a low resistance value;
   means for detecting a ratio of short-circuit currents of said first and second solar cells flowing in said first resistor and said second resistor, respectively; and
   means for calculating the sunbeam incident angle $\theta$ in terms of the tan $\theta$ from the ratio of short-circuit currents.

2. The device according to claim 1 wherein said first resistor and said second resistor each have a resistance value of 0.5 ohms.

3. A device for detecting sunbeam incident angle and azimuth with respect to a surface comprising:
   a first solar cell;
   a plurality of second solar cells, said first solar cell and said second solar cells being attached to said surface such that each of said second solar cells is perpendicular to said first solar cell thus forming a pair with each of said second solar cells and adjacent ones of said second solar cells being perpendicular to each other;
   a first resistor connected across said first solar cell;
   a plurality of second resistors each connected across respective second solar cells, said first resistor and said second resistors each having a low resistance value;
   a plurality of means each for detecting a ratio of short-circuit currents of solar cells flowing in said first resistor and each of said second resistors and for calculating the sunbeam incident angle $\theta$ in terms of the tan $\theta$ from the ratio of short-circuit currents for each of said pairs of first and second solar cells; and
   means for calculating the azimuth of the sunbeam from each of said sunbeam incident angles.

4. The device according to claim 3 further comprising switch means for selectively supplying the short-circuit current of said solar cell to each of said plurality of ratio detecting means.

5. The device according to claim 3 wherein said first solar cell and said plurality of second solar cells are attached together to form a cube.

* * * * *